(12) United States Patent
Tiryaki et al.

(10) Patent No.: US 10,464,659 B2
(45) Date of Patent: Nov. 5, 2019

(54) VERTICAL STABILIZER FOR AN AIRCRAFT

(71) Applicant: Airbus Operations GmbH, Hamburg (DE)

(72) Inventors: Memis Tiryaki, Hamburg (DE);
Matthias Hegenbart, Hamburg (DE);
Wolfgang Eilken, Hamburg (DE);
Michael Sauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 283 days.

(21) Appl. No.: 15/015,783

(22) Filed: Feb. 4, 2016

(65) Prior Publication Data
US 2016/0229520 A1 Aug. 11, 2016

(30) Foreign Application Priority Data

Feb. 6, 2015 (DE) .................. 10 2015 101 763

(51) Int. Cl.
*B64C 9/04* (2006.01)
*B64C 9/02* (2006.01)
(Continued)

(52) U.S. Cl.
CPC .............. *B64C 9/04* (2013.01); *B64C 9/02* (2013.01); *B64C 13/16* (2013.01); *B64C 23/06* (2013.01); *Y02T 50/162* (2013.01)

(58) Field of Classification Search
CPC .. B64C 9/02; B64C 9/04; B64C 13/16; B64C 23/06; Y02T 50/166
See application file for complete search history.

(56) References Cited

U.S. PATENT DOCUMENTS 2,852,209 A * 9/1958 Petre ................. B64C 13/00
244/213
3,112,089 A * 11/1963 Silvius .............. B64C 23/005
244/216
(Continued)

FOREIGN PATENT DOCUMENTS

CN 105857583 B 5/2018
CN 105857584 B 5/2018
(Continued)

OTHER PUBLICATIONS

German Search Report for Application No. 10 2015 101 765.2 dated Jun. 26, 2015.
(Continued)

*Primary Examiner* — Michael H Wang
(74) *Attorney, Agent, or Firm* — Jenkins, Wilson, Taylor & Hunt, P.A.

(57) ABSTRACT

A vertical stabilizer for an aircraft, including a fin, pivotable rudder, rudder adjustment arrangement, and vortex generator arrangement having on each side of the fin a turbulence generation element, each turbulence generation element disposed in a surface section of the fin and mounted moveably between a first, retracted position, where it is retracted into an interior space of the fin, and a second, extended position, where it projects at least partially outwardly from the fin transversely with respect to the surface section, and a turbulence generation element adjustment arrangement which is coupled to the rudder. The turbulence generation element adjustment arrangement engages the turbulence generation elements to move them. In a range of angular positions of the rudder, the turbulence generation element adjustment arrangement is inoperative for causing a movement of the turbulence generation elements out of the first position.

20 Claims, 4 Drawing Sheets

(51) Int. Cl.
*B64C 13/16* (2006.01)
*B64C 23/06* (2006.01)

(56) References Cited

U.S. PATENT DOCUMENTS

| | | | |
|---|---|---|---|
| 3,144,220 A | | 8/1964 | Kittelson |
| 4,039,161 A | * | 8/1977 | Bauer ............... B64C 23/06 138/39 |
| 4,739,957 A | | 4/1988 | Vess et al. |
| 5,054,720 A | * | 10/1991 | Page ............... B64C 23/06 244/200.1 |
| 5,209,438 A | | 5/1993 | Wygnanski |
| 5,253,828 A | * | 10/1993 | Cox ............... B64C 23/06 244/200.1 |
| 5,730,393 A | | 3/1998 | Hatrick et al. |
| 5,755,408 A | | 5/1998 | Schmidt et al. |
| 6,105,904 A | | 8/2000 | Lisy et al. |
| 6,481,363 B1 | * | 11/2002 | Liu ............... B63B 1/248 114/274 |
| 6,685,143 B1 | | 2/2004 | Prince et al. |
| 7,028,954 B2 | * | 4/2006 | Van Dam ............ B64C 3/44 244/204 |
| 7,293,959 B2 | | 11/2007 | Pedersen et al. |
| 7,410,133 B2 | * | 8/2008 | Lee ............... B64C 9/18 244/130 |
| 7,419,356 B2 | | 9/2008 | Stiesdal |
| 7,878,457 B2 | | 2/2011 | Narramore |
| 8,167,554 B2 | | 5/2012 | Wang et al. |
| 8,405,012 B1 | | 3/2013 | Herman et al. |
| 8,616,494 B2 | | 12/2013 | Neitzke et al. |
| 9,267,491 B2 | | 2/2016 | Vossler et al. |
| 9,429,400 B1 | * | 8/2016 | Sowle ............... F42B 10/02 |
| 9,505,485 B2 | * | 11/2016 | Dorsett ............... B64C 23/06 |
| 10,202,187 B2 | | 2/2019 | Hegenbart et al. |
| 2004/0129838 A1 | * | 7/2004 | Lisy ............... B64C 23/06 244/204.1 |
| 2009/0212158 A1 | | 8/2009 | Mabe et al. |
| 2010/0018322 A1 | | 1/2010 | Neitzke et al. |
| 2010/0038492 A1 | * | 2/2010 | Sclafani ............ B64C 7/02 244/199.1 |
| 2011/0142595 A1 | | 6/2011 | Santiago et al. |
| 2012/0134803 A1 | | 5/2012 | McGrath et al. |
| 2014/0186180 A1 | | 7/2014 | Neitzke et al. |
| 2014/0331665 A1 | | 11/2014 | Shivashankara et al. |
| 2015/0204306 A1 | * | 7/2015 | Herr ............... F03D 7/022 416/23 |
| 2016/0229526 A1 | | 8/2016 | Hegenbart et al. |

FOREIGN PATENT DOCUMENTS

| | | |
|---|---|---|
| EP | 2543588 | 1/2013 |
| EP | 2801521 | 11/2014 |
| EP | 3053826 B1 | 1/2018 |
| EP | 3053827 B1 | 7/2019 |
| JP | S61-54 398 A | 3/1986 |
| JP | 2008094177 | 4/2008 |
| WO | WO 2008 069 948 A1 | 6/2008 |

OTHER PUBLICATIONS

German Search Report for Application No. 10 2015 101 763.6 dated Jul. 7, 2015.
Extended European Search Report for Application No. 16154491 dated Jun. 8, 2016.
Extended European Search Report for Application No. 16154479 dated Jun. 10, 2016.
Notice of Publication for Application No. 15015804 dated Aug. 11, 2016.
Non-Final Office Action for U.S. Appl. No. 15/015,804 dated Dec. 21, 2017.
Chinese Office Action and First Search for Chinese Application No. 201610083597.6 dated Jul. 26, 2017.
Chinese Office Action and First Search for Chinese Application No. 201610084071.3 dated Aug. 22, 2017.
Notice of Allowance for U.S. Appl. No. 15/015,804 dated Oct. 3, 2018.

* cited by examiner

VERTICAL STABILIZER FOR AN AIRCRAFT

CROSS-REFERENCE TO RELATED APPLICATION

This application claims priority to German Patent Application No. 10 2015 101 763.6 filed Feb. 6, 2015, the entire disclosure of which is incorporated by reference herein.

TECHNICAL FIELD

The present application relates to a vertical tailplane or vertical stabilizer for an aircraft comprising a fin, a rudder which is pivotable with respect to the fin, and a rudder adjustment arrangement for adjusting or setting the angular position of the rudder with respect to the fin, wherein the angular position is modifiable to both sides from a position of 0° in which the rudder is aligned with the fin.

BACKGROUND

Vertical tailplanes or vertical stabilizers of aircraft serve to control and stabilize the aircraft about the vertical or yaw axis. The corresponding action of the vertical stabilizer can be adapted to the respective situation by changing the angular position of the rudder.

The aerodynamic effect of a vertical stabilizer is based to a significant extent on the flow profile which is established in operation of the aircraft at the surfaces of the fin and the rudder. However, with increasing angle of attack flow separation or stall may occur, in which condition the flow no longer follows the respective surface, but separates and moves away from the surface, and the rudder loses at least part of its effect. The separation of the flow occurs primarily if the boundary layer above the surface does not include sufficient energy for maintaining the flow along the surface contour.

Large angles of attack at the vertical stabilizer occur primarily if the aircraft velocity is relatively low and the rudder is strongly deflected. A strong deflection of the rudder is required in particular if thrust is decreasing on one side due to malfunction or failure of engines and steering in the opposite direction must be effected by the rudder in order to maintain the course of the aircraft. Angles of deflection of the rudder, which occur in the case of such an error condition and which reach or exceed, e.g., 25° or 30°, are not required during normal operation. Therefore, there is a need for particular measures for preventing flow separation and stall in particular in this error condition or in other flight or operation situations in which such a strong deflection of the rudder is necessary.

Vortex generators, which are also referred to as swirl vanes or turbulence generators, are projections located on surfaces of aircraft components over which flow occurs, which projections are configured and arranged to selectively generate vortices or turbulence in the boundary layer region of the flow and, in this manner, to supply the flow with energy and maintain the flow along the surface. Thereby a flow separation can be prevented or delayed, and it is possible to realize larger angles of attack without flow separation and stall. However, vortex generators always also cause an increase of drag and flow resistance so that they are associated with disadvantages outside such flight or operation situations. For this reason vortex generators are known which are selectively extendable and retractable or selectively unfoldable and foldable and which are preferably only extended or unfolded if required and are otherwise retracted or folded in in order not to increase the flow resistance.

SUMMARY

It is an object of the present disclosure to provide a vertical stabilizer or vertical tailplane which is of a simple construction and easy to operate and with which a flow separation or stall can be nevertheless reliably prevented, as well as an aircraft comprising such a vertical stabilizer.

This object is achieved by a vertical stabilizer or vertical tailplane having the features disclosed herein and by an aircraft having the features disclosed herein. Advantageous embodiments of the vertical stabilizer are the subject-matter of the respective dependent claims.

According to the present disclosure a vertical stabilizer or vertical tailplane for an aircraft comprises a fin, a rudder pivotable or rotatable with respect to the fin, and a rudder adjustment arrangement or mechanism for adjusting or setting the angular position of the rudder with respect to the fin. The angular position is modifiable or adjustable to both sides or into both directions from a position of 0°, in which the rudder is aligned with the fin.

The vertical stabilizer further comprises a vortex generator arrangement which comprises, on each side of the fin, one or more turbulence generation elements. Each of these turbulence generation elements is disposed in a surface section of the fin and is mounted to be moveable between a first, retracted position, in which it is retracted into an interior space or cavity of the fin, and a second, extended position, in which it projects or extends transversely with respect to the surface section at least partially outwardly from the fin. In other words, in the second position the respective turbulence generation element extends completely or at least with a part out of the—possibly curved—plane of the surface section, so that upon establishing a flow above the surface section the turbulence generation element extends into this flow and is able to generate turbulence or vortices therein. The first position and the second position are preferably end positions defined by a corresponding suitable stop Finally, the vertical stabilizer comprises a turbulence generation element adjustment arrangement or mechanism which is coupled to the rudder and is configured and adapted such that it can engage the turbulence generation elements and transfer a motion of the rudder to them in order to move them from their first into their second position. In this regard, the turbulence generation element adjustment arrangement is configured and arranged such that in a range of angular positions of the rudder limited on both sides of the angular position of 0° by a predetermined minimum angle the turbulence generation element adjustment arrangement is inoperative for effecting movement of the turbulence generation elements out of the first position, i.e., is unable to transfer a motion of the rudder to the turbulence generation elements. Only upon exceeding the minimum angle (on either side) at least a part of the turbulence generation elements is moved from the first position into the second position when further increasing the angle. The minimum angle is preferably at least 25° and more preferably at least 30°. However, depending on the construction and configuration of the aircraft the minimum angle can advantageously be, for example, 15°, 20°, 25°, 30°, 35°, 40° or 45°.

This configuration of a vertical stabilizer or vertical tailplane has the advantage that a flow separation or stall at the vertical stabilizer can be prevented reliably and automatically, and that the vertical stabilizer is nevertheless of a simple construction and has a low flow resistance and drag under normal operation conditions.

In a preferred embodiment each turbulence generation element is biased into the first position by a biasing mechanism or arrangement. In this manner a movement of the turbulence generation elements back into their first position can be realized in a particularly simple manner.

In a preferred embodiment each turbulence generation element is mounted in a guide which defines a linear movement of the turbulence generation element between the first and second positions. Alternatively it is also possible that each turbulence generation element is pivotably mounted about a respective pivot axis and is pivotable between the first position and the second position.

In a preferred embodiment the turbulence generation element adjustment arrangement is configured such that in the range of angular positions of the rudder limited on both sides of the angular position of 0° by the predetermined minimum angle the turbulence generation element adjustment arrangement does not engage the turbulence generation elements or is spaced from them. In this manner, the turbulence generation element adjustment arrangement is not able in this range of angular positions to effect movement of the turbulence generation elements out of their first position.

In this embodiment the turbulence generation element adjustment arrangement may comprise, for example, at least one first coupling element, which is supported rotatably about an axis of rotation and disposed within the interior space of the fin and which comprises a plurality of arms extending radially away from the axis of rotation and being spaced from each other in the circumferential direction. The turbulence generation element adjustment arrangement then also comprises at least one second coupling element, which is preferably rigidly connected to the rudder and preferably projects or extends from the rudder into the interior of the fin. The second coupling element is coupled to at least one of the at least one first coupling element in such a manner that the latter is put into rotation by changing the angular position of the rudder, wherein preferably any change of the angular position of the rudder results in a corresponding rotation of the first coupling element. The at least one first coupling element is arranged and configured such that in the range of angular positions of the rudder limited on both sides of the angular position of 0° by the predetermined minimum angle the arms of the at least one first coupling element are spaced from the turbulence generation elements, and that upon reaching the minimum angle at least one of its arms engages at least one of the turbulence generation elements and moves it from the first position into the second position when increasing the angle. Advantageously a different arm may be provided for each direction of rotation. Overall, the turbulence generation element adjustment arrangement may comprise one or more of the above first coupling elements and one or more of the above second coupling elements. In this regard, it is possible that a respective first coupling element is associated with a respective second coupling element and cooperates with this in the described manner, or that (only) one first coupling element cooperates with several or all second coupling elements or several or all first coupling elements cooperate with (only) one second coupling element. In particular, it is, for example, possible both that for a respective pair of opposite turbulence generation elements a respective first coupling element is provided, or that a first coupling element is provided for actuating several pairs of opposite turbulence generation elements or all turbulence generation elements. In the latter case the plurality of arms of the respective first coupling element can comprise arms, which are spaced from each other in the direction of the axis of rotation and which respectively correspond to the turbulence generation elements, or the arms may have a corresponding dimension or extension in the direction of the axis of rotation.

In this example, the at least one first coupling element may preferably comprise at least one elongate guide element, which is, for example, rod-shaped and which extends radially away from the axis of rotation and is rigidly connected to the plurality of arms. In the elongate guide element a, preferably linear, guide is provided or formed. The at least one second coupling element, which may, e.g., be bar-shaped, comprises an engagement portion, which is spaced from the rudder and which engages the linear guide, so that the engagement portion—and, thus, the second coupling element—is supported in a manner linearly guided along the linear guide. However, a relative rotation between the second coupling element and the elongate guide element is possible. In this manner, the second coupling element pivots together with the rudder and transfers its pivot movement to the elongate guide element. Due to the fact that the elongate guide element is rigidly connected to the arms of the first coupling element, a change of the angular position of the rudder effects or causes a corresponding rotation of the first coupling element and, in particular, of the arms about the axis of rotation. Preferably, for each second coupling element a corresponding elongate guide element is provided. However, it is also possible that an elongate guide element comprises multiple guides, each of which cooperates with another second coupling element.

In an alternative preferred embodiment the turbulence generation element adjustment arrangement comprises at least one elongate engagement element, which with a first end portion thereof is rigidly connected to the rudder and extends or projects from the rudder into the interior space of the fin, and which at its opposite second end portion is guided in a, preferably curved, guide, and this in such a manner that the second end portion of the engagement element moves along the guide upon changing the angular position of the rudder. The at least one engagement element is configured and arranged such that in the range of angular positions of the rudder limited on both sides of the angular position of 0° by the predetermined minimum angle the second end portion of the at least one engagement element is spaced from the turbulence generation elements. Further, each of the at least one engagement element is configured and arranged such that it engages at least one of the turbulence generation elements when the minimum angle is reached and moves this from the first position into the second position when increasing the angle. Overall, the turbulence generation element adjustment arrangement may comprise one or more of the above engagement elements. In this regard, it is possible that for a respective pair of opposite turbulence generation elements a respective engagement element is provided, or that an engagement element for actuating several pairs of opposite turbulence generation elements or all turbulence generation elements is provided.

In a further preferred embodiment the turbulence generation element adjustment arrangement is configured such that it engages the turbulence generation elements in every angular position of the rudder or already below the minimum angle.

In this embodiment the turbulence generation element adjustment arrangement may comprise, for example, at least one cam element rigidly connected to the rudder and having a surface contour facing away from the rudder. The cam element may also be integrally formed in one piece with the rudder and may, in particular, be realized by a particular shaping or surface formation of an end portion of the rudder facing the fin. The turbulence generation element adjustment arrangement then further comprises at least one cam follower element which engages the surface contour of the at least one cam element and is biased towards the surface contour, and at least one engagement element which engages at least one of the turbulence generation elements and which is coupled to the at least one cam follower element in such a manner that a movement of the at least one cam follower element causes a movement of the at least one engagement element. The surface contour of the cam element is configured such that in the range of angular positions of the rudder limited on both sides of the angular position of 0° by the predetermined minimum angle the at least one cam follower element is in a first position, in which the turbulence generation elements are in their first position. In other words, in this range of angular positions of the rudder the at least one cam follower element remains in a position out of which it would have to move in order to transfer via the corresponding at least one engagement element a movement to one or more of the turbulence generation elements when the latter are in their first position. The surface contour of the cam element is further configured such that upon reaching the minimum angle the at least one cam follower element is moved out of the first position by the cam element and, thereby, a movement of the at least one engagement element is caused or effected by which at least one of the turbulence generation elements is moved from the first position into the second position when increasing the angle.

Overall, the turbulence generation element adjustment arrangement may comprise one or more of the above cam element and one or more of the above cam follower elements. In this regard it is possible that, respectively, one cam element is associated with respectively one cam follower element and cooperates with it in the described manner, or that (only) one cam element cooperates with several or all cam follower elements or several or all cam elements cooperate with (only) one cam follower element. Each cam follower element may be coupled with only one or, preferably, with several ones of the engagement elements. In particular, it is, for example, possible both that for a respective pair of opposite turbulence generation elements a respective pair of engagement elements is provided, or that a pair of engagement elements is provided for actuating several pairs of opposite turbulence generation elements or all turbulence generation elements.

Independently, in this embodiment the turbulence generation element adjustment arrangement may preferably comprise at least one guide element, which is mounted in a predetermined position in the interior space of the fin and comprises a first linear guide, by which the at least one cam follower element is supported in a guided manner. Preferably, this is realized in such a manner that the at least one cam follower element is able to move linearly towards and away from the rudder, wherein the path defined by the linear guide preferably intersects a pivot axis of the rudder. Each of the at last one cam follower element is connected to two of the engagement elements. The engagement elements are constructed to be elongate and are each pivotably connected with a first end portion thereof to the cam follower element and guided with an opposite second end portion in a second—preferably linear—guide, and this in such a manner that the second end portion of the engagement elements moves along the second guide when the angular position of the rudder changes. The second guide extends between two of the turbulence generation elements, which are disposed on opposite sides of the fin, and each of the two engagement elements engages another one of the respective two turbulence generation elements. However, it is also possible to provide only one cam follower element or a lower number of cam follower elements and to couple each of these cam follower elements to multiple respective pairs of engagement elements.

In a preferred embodiment the turbulence generation element adjustment arrangement is adapted in such a manner that, depending on the direction in which the minimum angle is exceeded, turbulence generation elements are moved into their second position only on the corresponding side of the fin. In an alternative preferred embodiment the turbulence generation element adjustment arrangement is adapted in such a manner that, independent of the direction in which the minimum angle is exceeded, turbulence generation elements on both sides of the fin are moved into their second position.

The disclosure herein also provides an aircraft having a vertical stabilizer or vertical tailplane constructed in accordance with any one of the embodiments and configurations described in detail above.

BRIEF DESCRIPTION OF THE DRAWINGS

In the following preferred exemplary embodiments are explained with reference to the enclosed Figures.

FIG. 2b shows a further cross-sectional view of the vertical stabilizer of FIG. 2a.

FIG. 3b shows a further cross-sectional view of the vertical stabilizer of FIG. 3a.

DETAILED DESCRIPTION

Figure 1:
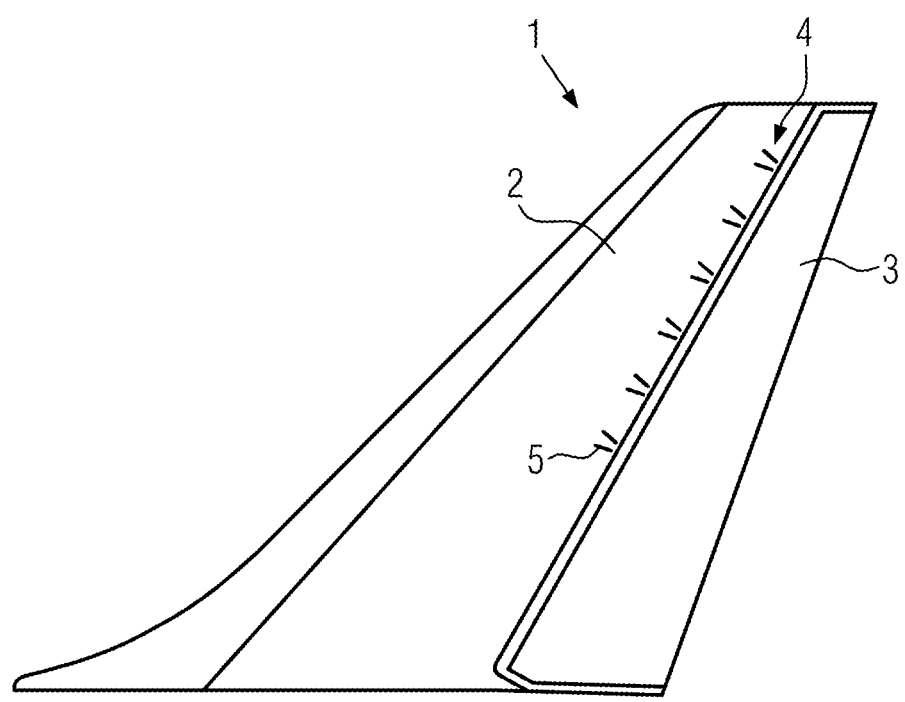
FIG. 1 shows a schematic view of a vertical stabilizer of an aircraft in accordance with the present disclosure.

The vertical stabilizer or vertical tailplane 1 shown in FIG. 1 comprises in a usual manner a fin 2 and a rudder 3 which is pivotable with respect to the fin 2. The vertical stabilizer 1 comprises a vortex generator arrangement 4 including a plurality of plate-shaped turbulence generation elements 5 which are arranged on each side of the fin 2 in the region of an end portion of the fin 2 facing the rudder 3. As will be explained in the following, the turbulence generation elements 5 can be moved between a retracted position, in which they are completely retracted into an interior space or cavity of the fin 2, and an extended position, in which they project or extend from the fin 2 transversely with respect to the surface of the fin 2 into a flow flowing in operation around the fin 2, in order to generate turbulence in the manner described above and to prevent in this manner a flow separation or stall in the region of the rudder 3 at large angles of attack. In more detail, the turbulence generation elements 5 are extended automatically when the angle of attack is increased by a strong angular deflection of the rudder 3.

Figure 2A:
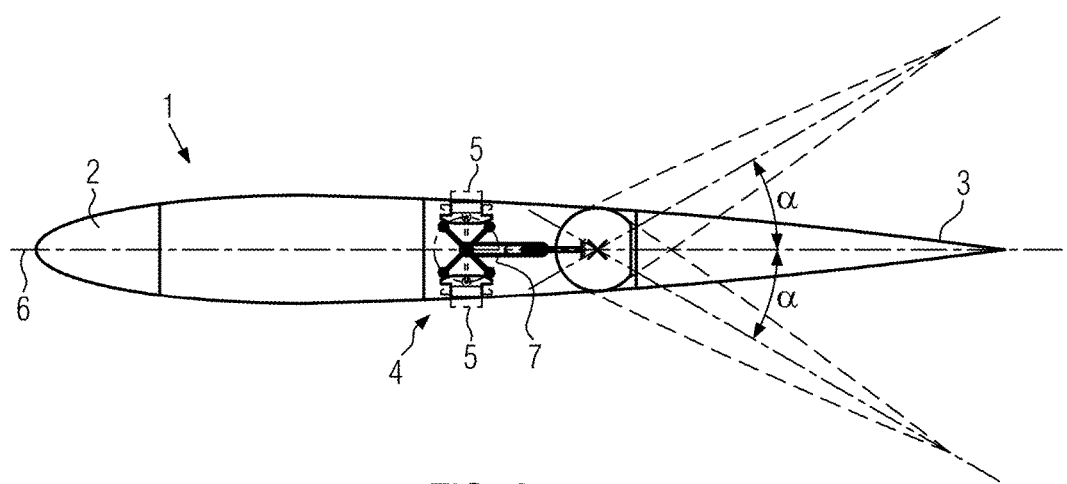
FIG. 2a shows a cross-sectional view of a vertical stabilizer according to an embodiment of the present disclosure.

In FIG. 2a, a cross-sectional view of the vertical stabilizer 1 is shown. The angular position of the rudder 3 with respect to the fin can be adjusted or changed in the usual manner by a rudder adjustment arrangement or mechanism, which is not shown. In the angular position of 0° shown in FIG. 2a with continuous lines (the angle α of the rudder 3 characterizing the angular position is indicated with respect to the symmetry plane 6 of the fin) the rudder 3 is aligned with the fin 2. From or out of this 0° position the angular position can be modified or adjusted to or towards both sides, as indicated by broken lines.

Figure 2B:
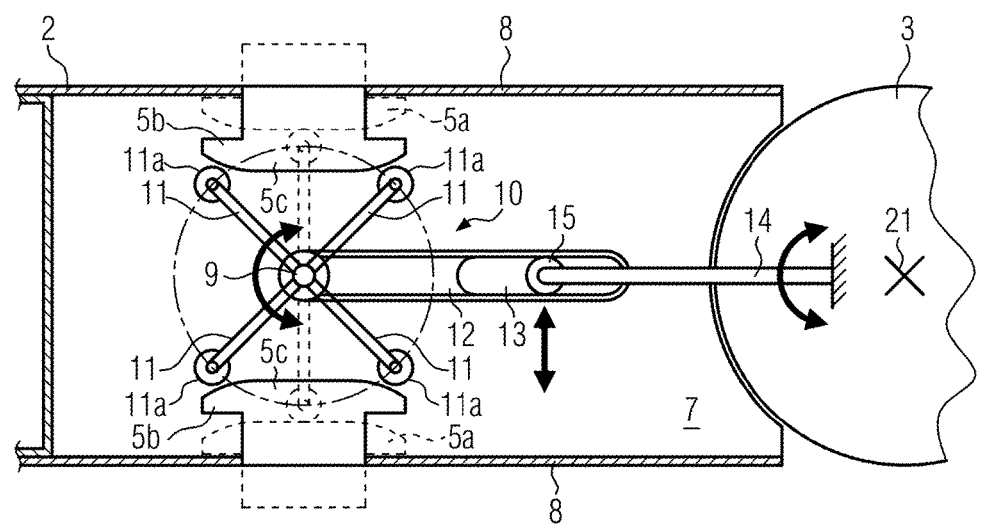

In FIG. 2b, an enlarged section of FIG. 2a is shown, wherein the rudder 3 is in the 0° position. In this position the two turbulence generation elements 5, which are visible in the cross-sectional view and are disposed on opposite sides of the fin 2, are completely retracted by a biasing arrangement or mechanism into an interior space or cavity 7 of the fin 2 (indicated with continuous lines). The turbulence generation elements 5 each comprise a plate portion 5a which extends in the plane of the drawing. With this plate portion 5a they can be moved against the biasing through slots in the wall 8 of the fin 2 into an extended position, which is indicated by broken lines. The movement between the retracted position and the extended position is in this case linear and may be guided by a suitable guide, which may, for example, comprise the slots.

In the interior space 7 a coupling element 10 is disposed as part of a turbulence generation element adjustment arrangement, which coupling element 10 is rotatable about an axis 9 of rotation fixed in the interior space 7. The axis 9 of rotation is on or extends in the symmetry plane 6 of the fin 2. First of all, the coupling element 10 comprises four arms 11, which extend radially away from the axis 9 of rotation and are spaced from each other in the circumferential direction. The spacing is chosen such that in the 0° position of the rudder 3 none of the arms 11 engages the turbulence generation elements 5, but that the arms 11 are spaced equally from the turbulence generation elements 5. The turbulence generation elements 5 are therefore in their retracted position.

The coupling element 10 further comprises a straight elongate guide element 12, which is rigidly connected to the arms 11 and, therefore, rotates about the axis 9 of rotation together with the arms 11 and the entire coupling element 10. In the 0° position of the rudder 3 the guide element 12 extends along the symmetry plane 6 towards the rudder 3. In the guide element 12 an elongate hole or longitudinal slot 13 is provided.

Moreover, the turbulence generation element adjustment arrangement comprises a rod-shaped coupling element 14, which is rigidly connected at one end to the rudder 3, so that it pivots together with the rudder 3. In the 0° position of the rudder 3 the rod-shaped coupling element 14 extends along the symmetry plane 6 towards the axis 9 of rotation and engages the elongate hole 13 with a roller element 15 provided at its end opposite the rudder 3. This end of the rod-shaped coupling element 14 is therefore connected to the guide element 12, wherein it is linearly guided in the elongate hole 13 and wherein the rod-shaped coupling element 14 and the guide element 12 are able to rotate with respect to each other about the axis of rotation of the roller element 15.

Due to this arrangement, upon changing the angular position of the rudder 3 out of the 0° position a torque is applied to the guide element 12 by the corresponding pivoting of the rod-shaped coupling element 14, so that the entire coupling element 10 is rotated by an angle which is unambiguously related to the change of the angular position of the rudder 3. Due to the arms 11 being spaced from the turbulence generation elements 5, independent of the direction of the angular deflection of the rudder 3 this rotation initially does not have the result that the arms 11 engage the turbulence generation elements 5. Only upon the angle α reaching a minimum value $α_{min}$ defined by the arrangement of the arms 11, a respective one of the arms 11 engages with a roller element 11a, which is provided at its end facing away from the axis 9 of rotation, one of the two turbulence generation elements 5, and this at a contact portion 5b of the respective turbulence generation element 5. This contact portion 5b is broadened as compared to the plate portion 5a and comprises a contact surface 5c facing the coupling element 10 and having beveled or tapered end portions. Upon a further increase of the angular position beyond the minimum value $α_{min}$ and the further rotation of the coupling element 10 effected thereby, the two turbulence generation elements 5 are pushed by the arms 11 against the biasing into the extended position illustrated with dashed lines. If the rudder is pivoted again towards the 0° position, the movement inverts or goes into reverse and the two turbulence generation elements 5 reach the retracted position when the rudder reaches the angular position $α_{min}$.

Thus, due to this arrangement, in the range of angles about the angular position of 0° limited on both sides by the angle $α_{min}$ the turbulence generation element adjustment arrangement does not at all engage the turbulence generation elements 5, which therefore remain in their retracted position when operating the rudder 3 in this range of angles. Only in the case of angular positions of at least $α_{min}$ the turbulence generation elements 5 are actuated in order to be moved into the extended position and to generate turbulence for preventing flow separation or stall. In this regard, the angle $α_{min}$ is preferably at least 25° and more preferably at least 30°, so that in normal operation the turbulence generation elements 5 remain in their retracted position and are automatically extended in the case of large angular positions of the rudder characteristic of an error condition—such as, for example, an engine failure on one side upon take-off.

Figure 3A:
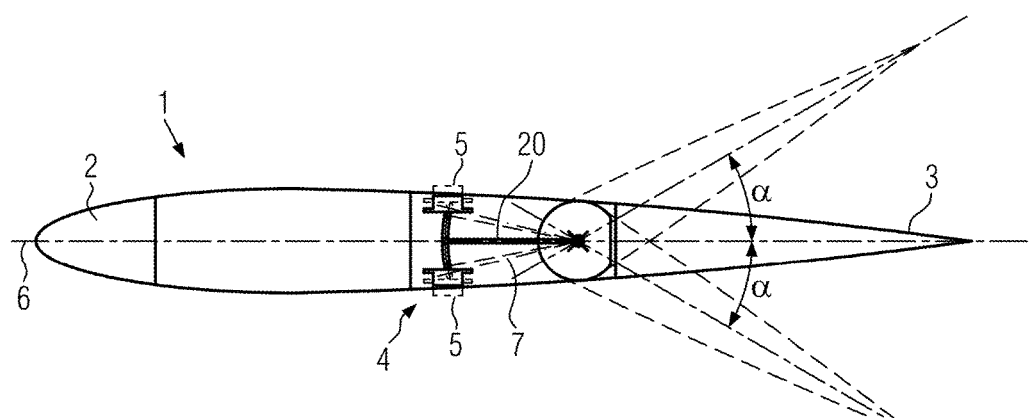
FIG. 3a shows a cross-sectional view of a vertical stabilizer according to another embodiment of the present disclosure.
Figure 3B:
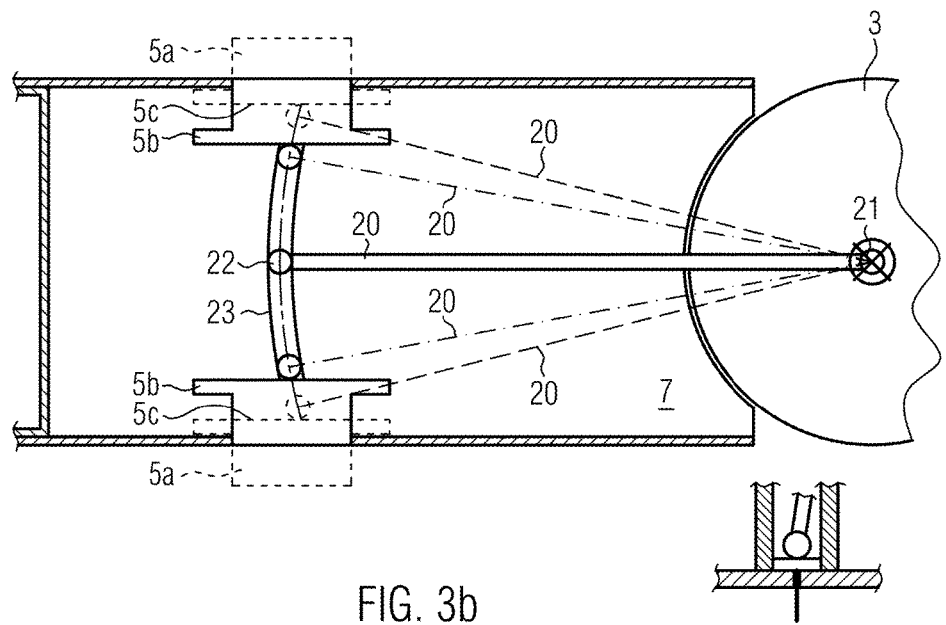

In the embodiment shown in FIGS. 3a and 3b a turbulence generation element adjustment arrangement likewise does not at all engage the turbulence generation elements 5 in the range of angles about the angular position of 0° limited on both sides by the angle $α_{min}$, which turbulence generation elements 5 therefore likewise remain in their retracted position by a suitable biasing when operating the rudder 3 in this range of angles.

With the exception of the shape of the contact portions 5c of the turbulence generation elements 5 this embodiment differs from the embodiment of FIGS. 2a and 2b only in the configuration and construction of the turbulence generation element adjustment arrangement. The latter comprises a rod-shaped engagement element 20 which is rigidly connected at one end thereof to the rudder 3, so that it pivots together with the rudder 3. To this extent it is similar to the rod-shaped coupling element 14 of the embodiment of FIGS. 2a and 2b. In the 0° position of the rudder 3 it extends along the symmetry plane 6, in which the pivot axis 21 of the rudder 3 is also disposed (in FIG. 3b indicated by continuous lines). With a roller element 22 provided at its end opposite the rudder 3 the engagement element 20 engages a guide 23 having the shape of a segment of a circle, which guide 23 is fixedly mounted in the interior space 7 and extends between the two turbulence generation elements 5 visible in the cross-sectional view of FIG. 3b. The roller element 22 is equally spaced from the turbulence generation elements 5.

Due to this arrangement, upon changing the angular position of the rudder 3 out of the 0° position the rod-shaped engagement element 20 is also pivoted by the same angle. In this process the roller element 22 is guided in the guide 23. Due to the roller element 22 being spaced from the turbulence generation elements 5, independent of the direction of the angular deflection of the rudder 3 this rotation initially does not have the result that the roller element 22 engages one of the turbulence generation elements 5. Only upon the angle α reaching a minimum value $α_{min}$ the roller element 22 engages one of the two turbulence generation elements 5, and this at the contact portion 5b which comprises a planar contact surface 5c (indicated by dash-dotted lines). Upon further increasing the angular position beyond the minimum angle $α_{min}$ and the further pivoting of the engagement element 20 effected or caused thereby, the respective turbulence generation element 5 is pushed by the engagement element 20 or its roller element 22 against the biasing into the extended position illustrated by dashed lines. If the rudder is pivoted again towards the 0° position, the movement inters or goes into reverse, and the turbulence generation element 5 reaches the retracted position when the rudder reaches the angular position $α_{min}$.

In contrast to the embodiment of FIGS. 2a and 2b, in the embodiment of FIGS. 3a and 3b only turbulence generation elements 5 on one side of the fin 2 are extended in each case, and this on the side which is opposite to the direction of the angular deflection of the rudder 3.

Figure 4:
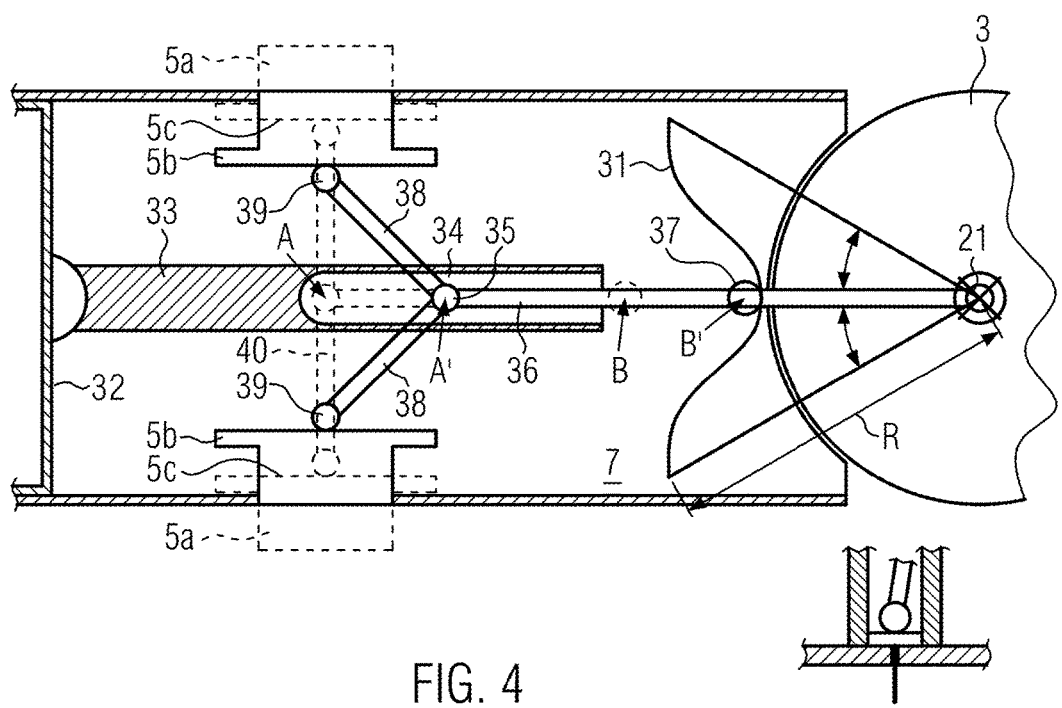
FIG. 4 shows a cross-sectional view of a vertical stabilizer according to yet another embodiment of the present disclosure.

FIG. 4 shows a further exemplary embodiment of a turbulence generation element adjustment arrangement. Otherwise the exemplary embodiment is equal to the exemplary embodiments of FIGS. 2 and 3. As part of the turbulence generation element adjustment arrangement a cam element 30 is disposed in the interior space 7 of the fin 2, which cam element 30 is rigidly coupled to the rudder 3 and comprises a surface contour 31 facing away from the rudder 3. Therefore, when changing the angular position of the rudder 3 the cam element 30 pivots by the same angle as the rudder.

A straight bar-shaped guide element 33 is rigidly secured to an interior wall 32 limiting the interior space 7 on the side opposite the rudder 3, which bar-shaped guide element 33 extends into the interior space 7 in the symmetry plane 6 of the fin 2 towards the rudder 3. The guide element 33 comprises a longitudinal bore or hole 34 which is in engagement with an end portion 35 of a rod-shaped cam follower element 36, and this such that the cam follower element 36 is linearly guided in the longitudinal hole 34 and cannot pivot with respect to the guide element 33. At the end of the cam follower element 36 opposite the end portion 35 a roller element 37 is mounted, with which it engages the surface contour 31. For this purpose, the cam follower element 36 is biased towards the cam element 30.

Between the two ends of the cam follower element 36 a respective straight rod-shaped engagement element 38 is articulated or pivotably connected with one end, each of which engagement element 38 extends on another side of the guide element 33 in an inclined manner or at an angle away from the guide element 33 and engages with a roller element 39, which is mounted on the end of the respective engagement element 38 opposite the cam follower element 36, the contact surface 5c of the respective turbulence generation element 5. In FIG. 4 the 0° position of the rudder 3 is shown with continuous lines. In this position the two turbulence generation elements 5 visible in FIG. 4 are in their retracted position into which they are biased. Thus, different from the exemplary embodiments of FIGS. 2 and 3 the turbulence generation element adjustment arrangement engages the turbulence generation elements 5 already in the 0° position.

The roller elements 39 are guided in a linear guide 40 which extends between the two turbulence generation elements 5. The surface contour 31 is configured such that the cam follower element 36, which rolls with the roller element 37 on the surface contour 31, initially does not move when the angular position of the rudder 3 is changed out of the 0° position, independent of the direction of the angular deflection of the rudder 3. Only when the angle α reaches a minimum angle $α_{min}$, the cam follower element 36 is pushed by the surface contour 31 towards the guide element 33 and is partially inserted into the longitudinal hole or bore 34. Due to the fact that the two engagement elements 38 are articulated or pivotably connected at one end to the cam follower element 36 and are guided at the other end in the guide 40, upon further increasing the angular position of the rudder 3 beyond the minimum value $α_{min}$, the two roller elements 39 move outwardly while increasing the angle between the two engagement elements 38 and thereby push the two turbulence generation elements 5 against the biasing into the extended position illustrated with dashed lines. When the rudder is pivoted again towards the 0° position, the movement inverts or goes into reverse, and the turbulence generation element 5 reaches the retracted position when the rudder reaches the angular position $α_{min}$.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vertical stabilizer for an aircraft, the vertical stabilizer comprising:
   a fin;
   a rudder pivotable about a pivot axis with respect to the fin;
   a rudder adjustment arrangement for adjusting an angular position of the rudder with respect to the fin, wherein the angular position is adjustable towards both sides from a position of 0°, in which the rudder is aligned with the fin;
   a vortex generator arrangement which comprises, on each side of the fin, at least one turbulence generation element, wherein each turbulence generation element is disposed in a surface section of the fin and is mounted moveably between a first position, in which the turbulence generation element is retracted into an interior space of the fin, and a second position, in which the turbulence generation element projects at least partially outwardly from the fin transversely with respect to the surface section; and
   a turbulence generation element adjustment arrangement which is coupled to the rudder and is configured to engage the turbulence generation elements and transfer a movement of the rudder to move the turbulence generation elements from the first position to the second position, wherein, in a range of angular positions of the rudder limited on both sides of the angular position of 0° by a predetermined minimum angle, the turbulence generation element adjustment arrangement is inoperative for causing a movement of the turbulence generation elements out of the first position and, only when the minimum angle is exceeded, moves at least a part of the turbulence generation elements from the first position to the second position when an angle is increased further, wherein the turbulence generation element adjustment arrangement is configured such that, in the range of angular positions of the rudder limited on both sides of the angular position of 0° by the minimum angle, the turbulence generation element adjustment arrangement does not engage the turbulence generation elements, and wherein the turbulence generation element adjustment arrangement comprises:

at least one first coupling element, which is disposed within the interior space of the fin, the at least one first coupling element comprising a plurality of arms that are connected to each other at an axis of rotation, which is spaced apart from the pivot axis, wherein each of the plurality of arms extend radially away from the axis of rotation and are rotatable about the axis of rotation, and wherein the plurality of arms are spaced from each other in a circumferential direction about the axis of rotation, and at least one second coupling element, which is connected to the rudder and is coupled to at least one of the at least one first coupling element, such that the at least one of the at least one first coupling element is rotated about the axis of rotation by changing the angular position of the rudder, wherein the at least one first coupling element is arranged such that, in the range of angular positions of the rudder limited on both sides of the angular position of 0° by the minimum angle, the plurality of arms of the at least one first coupling element are spaced from the turbulence generation elements and, when the minimum angle is reached, at least one of the plurality of arms engages with and moves at least one of the turbulence generation elements from the first position to the second position when the angle is increased.

2. The vertical stabilizer according to claim 1, wherein:

the at least one first coupling element comprises an elongate guide element, which extends radially away from the axis of rotation, is rigidly connected to the plurality of arms, and has a linear guide provided therein, and the at least one second coupling element comprises an engagement portion, which is spaced from the rudder and is in engagement with the linear guide so that the engagement portion is supported in a manner linearly guided along the linear guide.

3. The vertical stabilizer according to claim 2, wherein the minimum angle is at least 25°.

4. The vertical stabilizer according to claim 3, wherein the minimum angle is at least 30°.

5. The vertical stabilizer according to claim 1, wherein the minimum angle is at least 25°.

6. The vertical stabilizer according to claim 5, wherein the minimum angle is at least 30°.

7. The vertical stabilizer according to claim 1, wherein each turbulence generation element is biased into the first position by a biasing arrangement.

8. The vertical stabilizer according to claim 1, wherein each turbulence generation element is mounted in a guide which defines a linear movement of each turbulence generation element between the first and second positions, or wherein each turbulence generation element is mounted pivotably about a respective pivot axis and is pivotable between the first and second positions.

9. The vertical stabilizer according to claim 1, wherein the turbulence generation element adjustment arrangement is adapted in such a manner that, depending on a direction in which the minimum angle is exceeded, the turbulence generation elements are moved to the second position only on a corresponding side of the fin.

10. The vertical stabilizer according to claim 1, wherein the turbulence generation element adjustment arrangement is adapted in such a manner that, independent of a direction in which the minimum angle is exceeded, the turbulence generation elements on both sides of the fin are moved to the second position.

11. An aircraft comprising a vertical stabilizer according to claim 1.

12. A vertical stabilizer for an aircraft, comprising:

a fin;

a rudder pivotable with respect to the fin;

a rudder adjustment arrangement for adjusting an angular position of the rudder with respect to the fin, wherein the angular position is adjustable towards both sides from a position of 0°, in which the rudder is aligned with the fin, a vortex generator arrangement which comprises, on each side of the fin, at least one turbulence generation element, wherein each turbulence generation element is disposed in a surface section of the fin and is mounted moveably between a first position, in which the turbulence generation element is retracted into an interior space of the fin, and a second position, in which the turbulence generation element projects at least partially outwardly from the fin transversely with respect to the surface section, and a turbulence generation element adjustment arrangement which is coupled to the rudder and is configured to engage the turbulence generation elements and transfer a movement of the rudder to move the turbulence generation elements from the first position to the second position, wherein, in a range of angular positions of the rudder limited on both sides of the angular position of 0° by a predetermined minimum angle, the turbulence generation element adjustment arrangement is inoperative for causing a movement of the turbulence generation elements out of the first position and, only when the minimum angle is exceeded, moves at least a part of the turbulence generation elements from the first position to the second position when an angle is increased further, wherein the turbulence generation element adjustment arrangement is configured to engage the turbulence generation elements in every angular position of the rudder or already below the minimum angle, wherein the turbulence generation element adjustment arrangement comprises:

at least one cam element rigidly connected to the rudder and having a surface contour facing away from the rudder, at least one cam follower element which engages the surface contour of the at least one cam element and is biased towards the surface contour, and at least one engagement element which engages at least one of the turbulence generation elements and is coupled to the at least one cam follower element such that a movement of the at least one cam follower element causes a movement of the at least one engagement element, wherein the surface contour of the cam element is configured such that, in the range of angular positions of the rudder limited on both sides of the angular position of 0° by the predetermined minimum angle, the at least one cam follower element is in a first position of the cam follower element, in which the turbulence generation elements are in the first position of the turbulence generation elements, and, when the minimum angle is reached, the at least one cam follower element moves, by the cam element, out of the first position of the cam follower element and causes a movement of the at least one engagement element, by which at least one of the turbulence generation elements is moved from the first position of the turbulence generation elements into the second position of the turbulence generation elements when the angle is increased.

13. The vertical stabilizer according to claim 12, wherein:

the turbulence generation element adjustment arrangement comprises at least one guide element, which is mounted in a predetermined position in the interior space of the fin and comprises a linear guide, by which the at least one cam follower element is supported in a guided manner;

the at least one engagement element comprises a plurality of engagement elements;

each cam follower element is connected to two engagement elements of the plurality of engagement elements, wherein the plurality of engagement elements are constructed to be elongate and are each pivotably connected, with a first end portion thereof, to the cam follower element and guided, with an opposite second end portion, in a second guide, such that the second end portion moves along the second guide when the angular position of the rudder changes; and the second guide extends between two of the turbulence generation elements that are disposed on opposite sides of the fin, and each of the two engagement elements engages another of the two turbulence generation elements, respectively.

14. The vertical stabilizer according to claim 12, wherein the turbulence generation element adjustment arrangement is adapted in such a manner that, depending on a direction in which the minimum angle is exceeded, the turbulence generation elements are moved to the second position only on a corresponding side of the fin.

15. The vertical stabilizer according to claim 12, wherein the turbulence generation element adjustment arrangement is adapted in such a manner that, independent of a direction in which the minimum angle is exceeded, the turbulence generation elements on both sides of the fin are moved to the second position.

16. The vertical stabilizer according to claim 12, wherein the minimum angle is at least 25°.

17. The vertical stabilizer according to claim 16, wherein the minimum angle is at least 30°.

18. The vertical stabilizer according to claim 12, wherein each turbulence generation element is biased into the first position by a biasing arrangement.

19. The vertical stabilizer according to claim 12, wherein each turbulence generation element is mounted in a guide which defines a linear movement of each turbulence generation element between the first and second positions, or wherein each turbulence generation element is mounted pivotably about a respective pivot axis and is pivotable between the first and second positions.

20. An aircraft comprising a vertical stabilizer according to claim 12.

* * * * *